(12) United States Patent
Hudson et al.

(10) Patent No.: US 9,523,416 B2
(45) Date of Patent: Dec. 20, 2016

(54) ACTUATOR ARRANGEMENT

(71) Applicant: Goodrich Actuation Systems Limited, Birmingham (GB)

(72) Inventors: Tim Hudson, Birmingham (GB); Tony Jones, Birmingham (GB); Nicholas Sloane, Birmingham (GB)

(73) Assignee: GOODRICH ACTUATION SYSTEMS LIMITED, Birmingham (GB)

( * ) Notice: Subject to any disclaimer, the term of this patent is extended or adjusted under 35 U.S.C. 154(b) by 182 days.

(21) Appl. No.: 14/068,521

(22) Filed: Oct. 31, 2013

(65) Prior Publication Data

US 2014/0230584 A1    Aug. 21, 2014

(30) Foreign Application Priority Data

Oct. 31, 2012    (GB) .................................. 1219560.8

(51) Int. Cl.
| | | |
|---|---|---|
| *F16H 25/20* | (2006.01) | |
| *F16H 19/02* | (2006.01) | |
| *F02K 1/76* | (2006.01) | |
| *F16H 25/24* | (2006.01) | |
| *H02K 7/116* | (2006.01) | |

(52) U.S. Cl.
CPC ............. *F16H 19/02* (2013.01); *F02K 1/763* (2013.01); *F16H 25/2454* (2013.01); *H02K 7/116* (2013.01); *Y10T 74/18576* (2015.01)

(58) Field of Classification Search
CPC .............................................. F16H 2025/2087
See application file for complete search history.

(56) References Cited

U.S. PATENT DOCUMENTS

| | | | | |
|---|---|---|---|---|
| 2,444,886 | A | * | 7/1948 | Vickers ............... F16H 25/2204 192/223.3 |
| 3,693,759 | A | * | 9/1972 | Schindel .................. F03G 1/00 185/40 B |
| 6,158,295 | A | * | 12/2000 | Nielsen ................... F16H 25/20 192/223.4 |
| 2008/0072695 | A1 | * | 3/2008 | Hudson .................. B64C 13/28 74/89.25 |
| 2013/0152717 | A1 | * | 6/2013 | Kopecek ................. B64C 13/28 74/89.39 |

FOREIGN PATENT DOCUMENTS

| | | |
|---|---|---|
| GB | 872577 | 7/1961 |
| GB | 1200277 | 7/1970 |
| WO | 2006089526 | 8/2006 |
| WO | 2012139832 | 10/2012 |

OTHER PUBLICATIONS

Search report dated Feb. 21, 2013 for GB 1219560.8, filed Oct. 31, 2012. (5 Pages).

* cited by examiner

*Primary Examiner* — Robert Hodge
*Assistant Examiner* — Ryan Dodd
(74) *Attorney, Agent, or Firm* — Cantor Colburn LLP

(57) ABSTRACT

An actuator arrangement comprises an epicyclic gear set 4a, 4b including a sun gear 7, at least one planet gear 9 in meshing engagement with the sun gear 7, and a ring gear 3 in meshing engagement with the planet gear 9, the planet gear 9 being carried by a rotatable support 5, wherein one of the sun gear 7 and the support 5 is arranged to be driven by a motor 2 and the other of the sun gear 7 and the support 5 is arranged to drive an actuator 18, and a clutch arrangement 6 operable to resist rotation of the ring gear 3.

7 Claims, 3 Drawing Sheets

ACTUATOR ARRANGEMENT

CROSS REFERENCE TO RELATED APPLICATIONS

This application is a non-provisional patent application which claims the benefit of GB Application No. 1219560.8 filed Oct. 31, 2012, the entire contents of which are incorporated herein by reference.

BACKGROUND

This invention relates to an actuator arrangement for use in aerospace applications. In particular, it relates to an actuator arrangement suitable for use in driving, for example, a variable area fan nozzle (VAFN) cowl, thrust reverser cowl or flight control surface such as a wing mounted flap or slat for movement between retracted and extended or stowed and deployed positions. For convenience, the description herein relates primarily to the use of the actuator arrangement in controlling the movement of and position occupied by a VAFN cowl, but it will be appreciated that the invention is not restricted in this regard.

Typically, hydraulically driven actuators have been used to drive VAFN cowls between their retracted and extended positions. Recently, there has been a move towards driving VAFN cowls, and other movable aircraft components, using electrically powered actuators. By way of example, a variable speed electric motor may be used to drive a linearly extendible actuator to control movement of the VAFN cowl. Appropriate position sensors may be used to monitor the position of the actuator and/or cowl, and the position information used in controlling the operation of the electric motor so as to slow the rate of movement of the cowl as it approaches its fully extended and fully retracted positions. Stops are typically provided in order to limit the range of movement of the cowl, preventing movement of the cowl beyond a predetermined position in the event of, for example, a powered runaway condition in which the motor fails to slow the cowl as the end of the normal range of movement is approached. Under normal operation, movement is arrested shortly before or as the stops engage, and the loads borne by the stops are thus relatively low other than in exceptional circumstances.

The provision of a variable speed motor and associated control circuits can result in the actuator arrangement being relatively large and heavy. As only limited space is available to accommodate the various aircraft components, and as the use of heavy components on an aircraft will negatively impact upon its efficiency, it is desirable to avoid the use of such components.

One possibility which has been considered is to replace the variable speed motor and associated control circuits with a more simple, fixed speed motor controlled in such a manner as to drive the actuator to a point at which the stops are engaged. Once this point is reached, the motor will stall, and stalling of the motor may be sensed, providing an indication that the cowl is fully extended or fully retracted, depending upon the direction in which it was being moved. Once a motor stall has been sensed the motor may be de-energized to terminate drive to the actuator. The use of a fixed speed motor operating in an open loop fashion allows significant savings to be made in terms of size, weight and cost, and simplifies the system considerably.

Whilst such an arrangement may achieve savings in relation to the motor and associated control circuit, it may result in the need to provide larger, more robust stops as the stops will be required to prevent over extension or retraction of the actuator during every operating cycle thereof, rather than serving to prevent over extension or retraction only in the event of a powered runaway condition or other exceptional circumstances. As the stops must be capable of repeatedly arresting actuator movement, with the actuator being driven at high speed immediately prior to engagement of the stops, it will be appreciated that large, heavy, robust stops are required in order to ensure reliable operation. The provision of such large stops is undesirable.

It is an object of the invention to provide an actuator arrangement in which at least some of the disadvantages associated with the arrangements outlined above are overcome or of reduced effect.

SUMMARY

According to a first aspect of the invention there is provided an actuator arrangement comprising an epicyclic gear set including a sun gear, at least one planet gear inmeshing engagement with the sun gear, and a ring gear in meshing engagement with the planet gear, the planet gear being carried by a rotatable support, wherein one of the sun gear and the support is arranged to be driven by a motor and the other of the sun gear and the support is arranged to drive an actuator; and a clutch arrangement operable to resist rotation of the ring gear.

Conveniently, the clutch arrangement comprises an eddy current clutch arrangement. The motor is preferably an electric motor, for example a fixed speed motor, and the actuator preferably comprises a ball-screw actuator.

The eddy current clutch arrangement may comprise a permanent magnet and a conducting element, one of which is attached to the ring gear of the epicyclic gear set and the other of which is fixed, and an air gap being provided therebetween. Relative movement between the conducting element and permanent magnet thereby results in the formation of eddy currents in the conducting element that result in a resistance to rotation of the ring gear to which the eddy current clutch is coupled. Conveniently, the permanent magnet is attached to the ring gear of the epicyclic gear set, the conducting element being fixed. Heat may thereby be readily dissipated from the fixed conducting element into fixed structural elements. In an alternative arrangement the permanent magnet may be fixed, and the conducting element carried by the ring gear of the epicyclic gear set.

A plurality of permanent magnets may be carried by the ring gear, regularly spaced around the external circumference of the ring gear.

The conducting element may be substantially cylindrical, and coaxial with the ring gear.

The conducting element may comprise a material with a high electrical conductivity, for example copper or aluminium.

Alternatively, the clutch arrangement may comprise a frictional clutch arrangement.

A plurality of epicyclic gear sets may be provided, arranged in series.

A brake arrangement may be provided, operable to exert a braking force on a drive shaft coupled to the epicyclic gear set. The brake arrangement is preferably a power off brake, and is preferably located between the epicyclic gear set and the actuator.

The actuator drive shaft may be coupled to a further arrangement of gears, configured to distribute rotational drive from the actuator drive shaft to at least one actuator that is offset from the axis of the actuator drive shaft and/or to change the drive ratio. The further arrangement of gears may comprise bevel gears.

Flexible drive shafts may be provided, thereby providing a degree of compliance to reduce shock loadings on the components of the actuator arrangement. A stop means may be provided, independent of the actuator and coupled to the drive shaft. The stop means may comprise a stop element, a threaded element and limit stops, wherein: the threaded element is coupled to the drive shaft, the stop element is engaged with the threaded element so as move along the threaded element as it rotates, and the limit stops are arranged to limit the extent of movement of the stop element along the threaded element.

A telescopic rotational coupling may be provided to couple rotational drive to the actuator while accommodating relative movement between the actuator and the telescoping drive arrangement.

According to another aspect of the invention there is provided an actuator arrangement comprising a motor operable to drive an actuator for movement, the motor being connected to the actuator by an actuator drive shaft, and stop means arranged to limit the range of movement of the actuator, the stop means comprising a stop element, a threaded element and a limit stops, wherein the threaded element is coupled to the actuator drive shaft, the stop element is engaged with the threaded element so as to move along the threaded element as the threaded element rotates, and the limit stops are arranged to limit the extent of movement of the stop element along the threaded element.

According to a further aspect of the invention, there is provided a variable area fan nozzle comprising an actuator arrangement of the type described hereinbefore.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
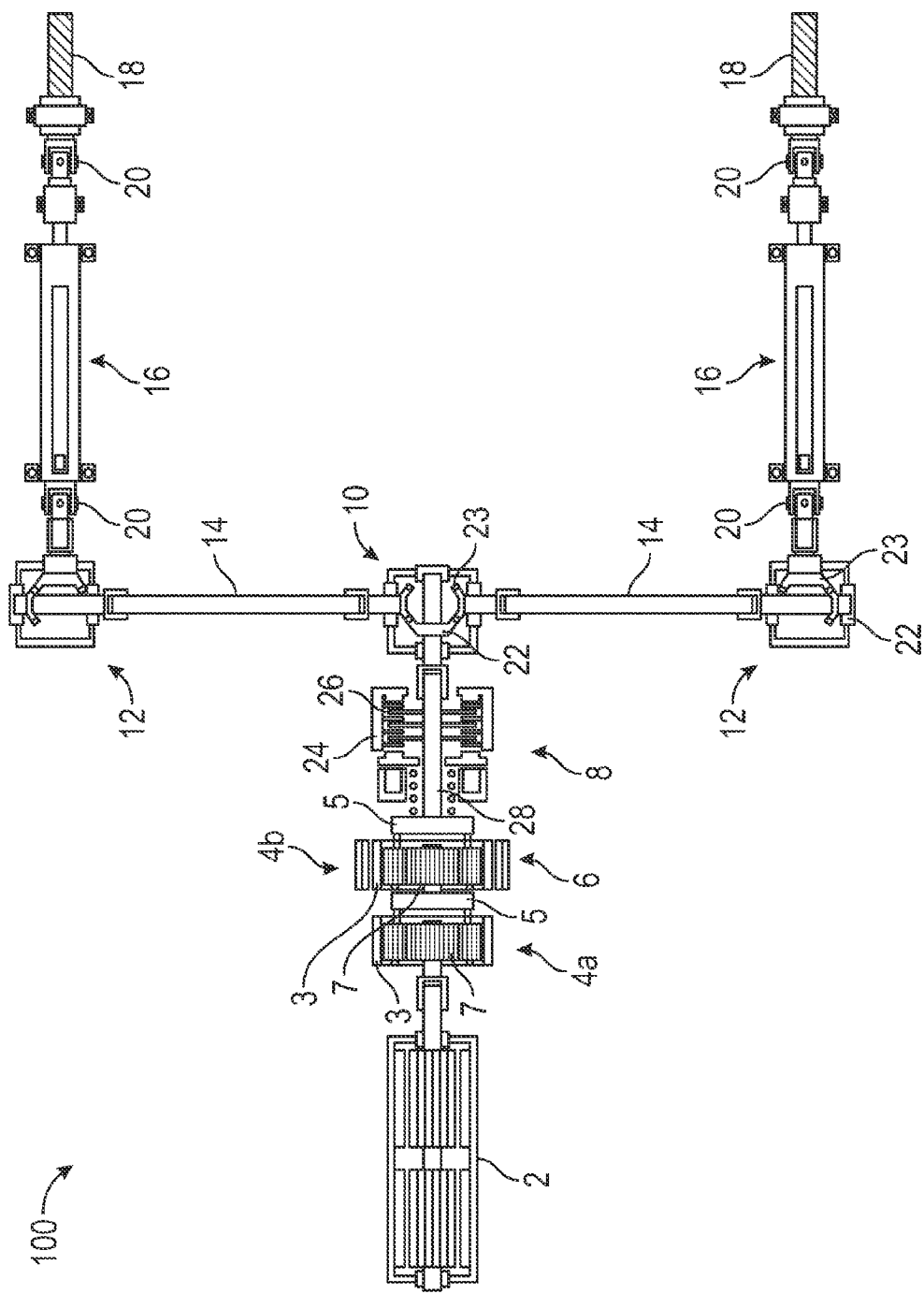
FIG. 1 is a schematic view of an actuator arrangement according to an embodiment of the invention.

Referring firstly to FIG. 1, an actuator arrangement 100 is shown, comprising an electric motor 2 coupled to a series arrangement of two epicyclic gear sets 4a and 4b. The electric motor 2 is coupled directly to the first gear set 4a, and the second gear set 4b is coupled directly the first gear set 4a.

An eddy current clutch 6 is fitted to either of the first or second epicyclic gear sets 4a, 4b. FIG. 1 shows the eddy current clutch 6 fitted to the second of the epicyclic gear sets 4b, but there may be circumstances in which it would be preferred to have the clutch 6 fitted to the first gear set 4a. Furthermore, in some arrangements, only a single epicyclic gear arrangement may be present.

Figure 2:
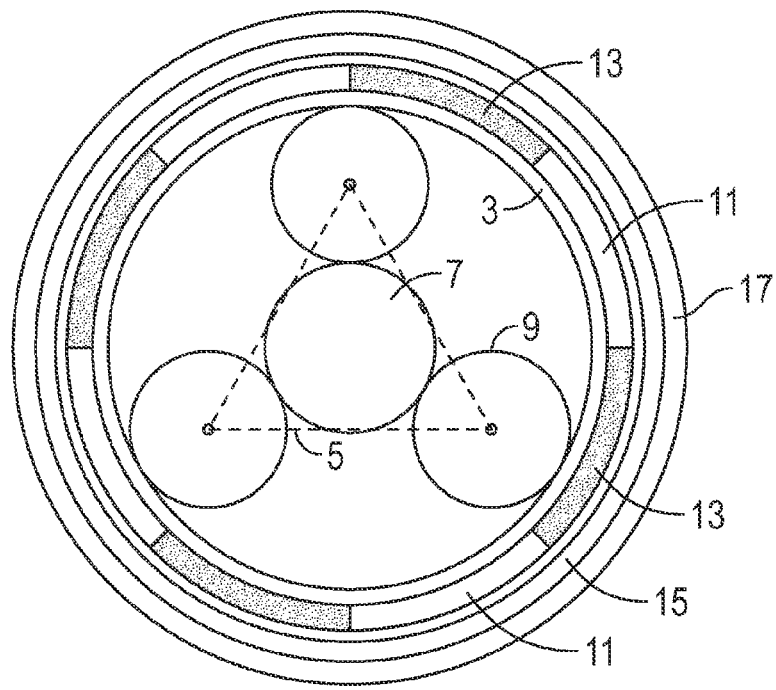
FIG. 2 is a schematic view of an epicyclic gear set and eddy current clutch forming part of the arrangement of FIG. 1.

Referring to FIG. 2, an epicyclic gear set with an eddy current clutch 6 is shown in more detail. The epicyclic gear set has three elements, a sun 7, a support or carrier 5 and a ring 3. The sun 7 and the ring 3 comprise gears, and the carrier 5 carries a plurality of planetary gears 9 in meshing engagement with the gear teeth of the sun 7 and the ring 3 respectively. The eddy current clutch 6 comprises an arrangement of magnets 11, 13 coupled to the ring 3 of the epicyclic gear set, and a fixed conducting element 15 is arranged adjacent to the magnet arrangement 11, 13 with an air gap therebetween, so that relative movement between the magnet arrangement 11, 13 and the conducting element 15 results in the formation or generation of eddy currents within the conducting element 15. It will be appreciated that the generation of eddy currents within the conducting element 15 requires power, and that the rotation of the magnet arrangement 11, 13 is accordingly subject to resistance due to the eddy current clutch 6. In the arrangement of FIG. 2, a plurality of magnets 11, 13 are arranged in an array around the external circumference of the ring 3, and the conducting element 15 is substantially cylindrical. However, this need not always be the case and other arrangements are possible. The conducting element 15 preferably comprises a highly electrical conductive material such as copper or aluminum. In the arrangement shown, adjacent to the conducting element 15 is a magnetic outer ring element 17, configured to maximize the magnetic flux in the conducting element 15 from the permanent magnets 11, 13.

The skilled person will appreciate that, in general, a rotational input to one of the sun, the carrier and the ring of an epicyclic gear set is transferred between the two remaining elements thereof, which, in use, serve as outputs. If one output element is held fixed, the remaining output element will be forced to rotate in response to rotation of the input element. If neither output element is fixed, then both will rotate. The distribution of torque between the output elements may be controlled by varying the resistance to rotation of one of the elements. The output element offering the least resistance will tend to rotate more than the output element with greater resistance. The gear ratio between the input and the respective output elements is a factor in the apparent resistance of the respective output elements. An epicyclic gear set may therefore be operated as a clutch by means of a braking arrangement that provides a resistance to rotation for one of the output elements. In the present invention, the eddy current clutch 6 coupled to the ring 3 provides this resistance to rotation.

Figure 3:
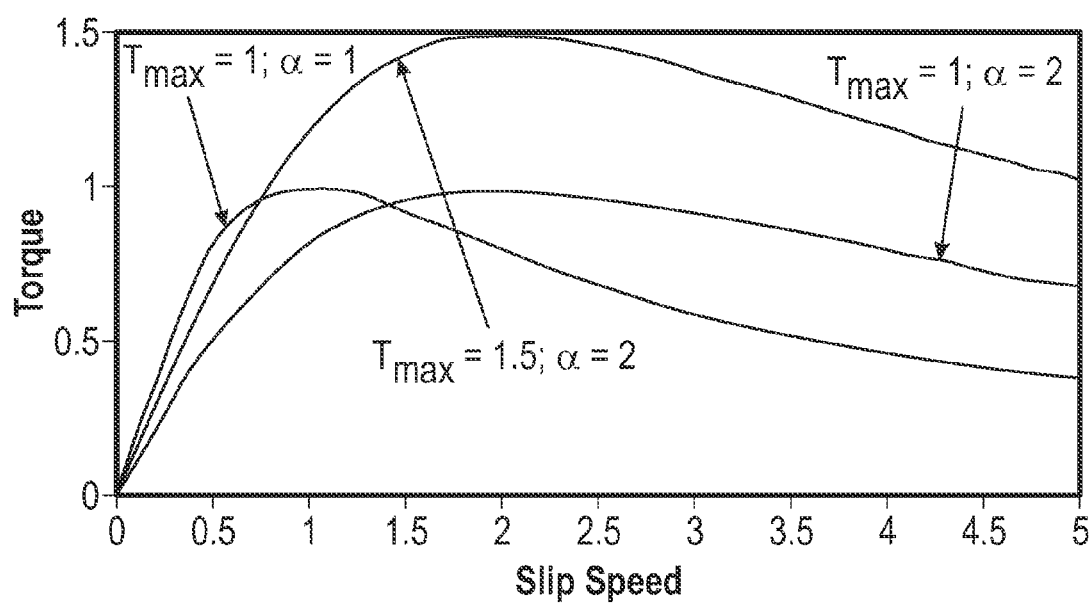
FIG. 3 is a graph depicting the torque vs. slip characteristics for a number of eddy current clutch arrangements.

The resistance to rotation provided by an eddy current clutch 6 is a function of the slip speed, being the difference in rotational speed between the conducting element 15 and the permanent magnets 11, 13. FIG. 3 illustrates a number of graphs for different designs of eddy current clutch 6. In general, the braking torque increases from zero in the no-slip condition, to a maximum braking torque at a specific slip speed, then reduces gradually as slip speed further increases.

The braking torque of the eddy current clutch 6 results in power being dissipated in the conducting element 15, resulting in heating of this element. Since the conducting element 15 is fixed, this heat may readily be dissipated into the fixed structural elements of the actuator arrangement 100.

Returning to FIG. 1, the electric motor 2 is coupled to the sun 7 of the first epicyclic gear set 4a, and the ring 3 of the first epicyclic gear set 4a is fixed. The sun 7 of the second epicyclic gear set 4b is coupled to the carrier 5 of the first epicyclic gear set. The eddy current clutch 6 is coupled to the ring 3 of the second epicyclic gear set 4b. The carrier 5 of the second epicyclic gear set 4b is coupled to a first end of a drive shaft 28.

A drive ratio is thereby provided between the electric motor 2 and the drive shaft 28, wherein the drive shaft 28 rotates more slowly than the electric motor 2, but with increased torque. The ratio of the first and second epicyclic gear set may for instance be approximately 5:1, giving a combined drive ratio of approximately 10:1.

A conventional power-off brake arrangement 8 is coupled to the drive shaft 28, comprising a plurality of frictional elements 24, 26 fixed to the drive shaft 28 and a fixed brake body respectively. Actuation of the brake 8 by removal of electrical power thereto causes engagement of the frictional elements 24, 26 resulting in a braking force that resists rotation of the drive shaft 28.

The second end of the drive shaft 28 is coupled to a gearbox 10, comprising an input bevel gear 22 coupled to a pair of output bevel gears 23. The output bevel gears 23 each have an axis of rotation that is oriented normal to that of the input gear 22, and the output gears 23 respectively drive two flexible drive shafts 14 that extend in opposite, substantially co-axial directions.

Each flexible drive shaft 14 is coupled to a further gearbox arrangement 12 comprising a substantially orthogonal bevel input gear 22 and bevel output gear 23. The output gear 23 of the further gearbox is in turn coupled via a universal joint 20 to a telescopic drive arrangement 16. The telescopic drive arrangement 16 has a first and second end, and is arranged to provide a rotational coupling between the first and second end, while accommodating changes in distance between the first and second end. The first end of the telescopic drive arrangement 16 may for instance be carried by a fixed part of an engine nacelle, and the second end may be secured to a moveable thrust reverser which carries an actuator 18 that is driven by rotation of the second end of the telescopic drive arrangement to drive an associated VAFN cowl for movement.

In use, when it is desired to adjust the position of the VAFN cowl, the brake 8 is released and the motor 2 is energized. The operation of the motor 2 is transmitted through the first and second gear sets 4a, 4b to cause rotation of the drive shaft 28. The rotation of the drive shaft 28 is transmitted via the gearbox 10, shaft 14, gearbox 12 and telescopic drive arrangement 16 to cause extension or retraction of the actuator 18. The motor 2 is a fixed speed motor, thus the motor does not serve to vary the rate of extension or retraction of the actuator 18 during operation thereof. Once the actuator 18 reaches the end of its normal range of movement, end stops incorporated therein engage to resist further movement of the actuator 18, it will be appreciated that rotation of the telescopic drive arrangement 16, shafts 14 and drive shaft 28, along with the carrier 5 connected to the drive shaft 28, will cease. During this phase in the operation of the actuator arrangement, the motor 2 will still be energized, drive the sun 7 for movement. With the sun 7 driven for movement, and the carrier 5 non-rotating, it will be appreciated that the load urging the ring 3 for rotation will increase, and a point will be reached beyond which the ring 3 is able to overcome the braking load applied thereto by the eddy current clutch 6 and so commences rotation. It will be appreciated that the rotation of the ring 3 reduces the transmission of torque through the epicyclic gear set 4b to the actuator 18. As a consequence, the size loadings experienced by the stops of the actuator 18 may be reduced, compared to arrangements in which no such clutch is present. Accordingly, the stops may be of a reduced size.

Subsequently, the motor 2 may be de-energized.

As outlined hereinbefore, this arrangement has the advantage that a simple, fixed speed motor may be used without the need to provide a complex, closed loop control scheme and without having to provide excessively large actuator stops.

It will be appreciated that the clutch arrangement of the present invention decouples the electric drive motor from the actuator, so that unexpected high loads are not transmitted between the actuator and drive motor. Such high loads may be associated with shock loading as a result of hitting an end stop, or due to jamming of the actuator.

A jammed actuator will simply result in a slipping clutch, and the maximum torque will be limited by the clutch, preventing damage to the actuator. Similarly, the inertial loads of the actuator and the parts driven by the actuator are decoupled from the drive system, and vice versa. The decoupling of the drive and actuator minimizes the inertia associated with the actuator and its associated mechanism. The stops for the actuator therefore only have to deal with the inertia of the actuator rather than that of the drive and motor.

Whilst in the arrangement described hereinbefore the clutch is an eddy current based clutch, it will be appreciated that it could be replaced by, for example, a friction brake.

However, such an arrangement would have the disadvantage that it increases the number of wear components present in the device, increasing the maintenance and services requirements.

Figure 4:
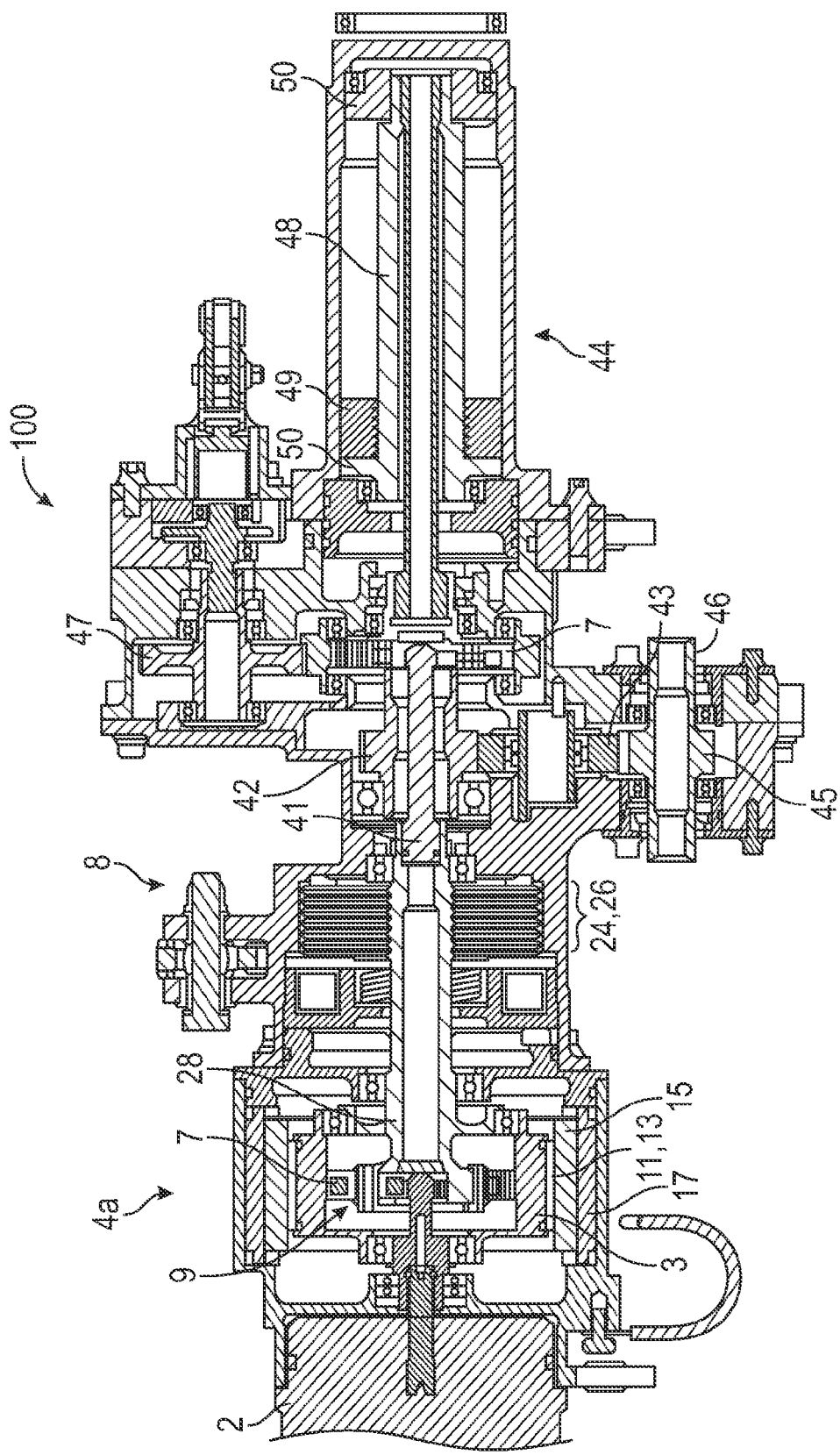
FIG. 4 is a sectional drawing showing part of an actuator arrangement according to another embodiment of the invention.

Referring next to FIG. 4, another embodiment of the invention is shown. In many respects, the arrangement of FIG. 4 is similar to that described hereinbefore, and like reference numerals will be used to denote like parts. In this arrangement the electric motor 2 is coupled to the sun 7 of an epicyclic gear set 4a. An eddy current clutch 6 is provided coupled to the ring 5 of the epicyclic gear set 4a, and permanent magnets 11, 13 are mounted on the exterior circumference of the ring 5. Adjacent to the permanent magnets, and separated from them by a small air gap, is a substantially cylindrical conducting element 15, which is fixed to the case of the gearbox. The conducting element 15 is disposed within a substantially cylindrical magnetic element 17 which is arranged to maximize the magnetic coupling between the moveable permanent magnets 11, 13 and the conducting 15.

The carrier 5 of the epicyclic gear set 4a is coupled to a first end of a hollow drive shaft 28. A conventional power-off brake arrangement 8 comprising rotating and fixed friction plates 24, 26 is coupled to the drive shaft 28, configured to provide a braking force on the drive shaft 28 when the solenoid actuator of the brake arrangement 8 is de-energized, releasing the braking load when energized. The second end of the drive shaft 28 is coupled to a further solid drive shaft 41 that is coupled to the sun 7 of a second epicyclic gearbox 4b.

Concentric with the solid drive shaft 41 is a further hollow drive shaft 42 that is connected to the carrier 5 of the second epicyclic gear set 4b. The further hollow drive shaft 42 carries a gear that meshes with a carrier output gear set comprising first and second output gears 43, 45 and an output shaft 46. Output shaft 46 is connected, via appropriate drive shafts and to like to an associated actuator 18.

The ring 3 of the second epicyclic gear set 4b is provided with external gear teeth meshing with a ring input gear 47 to which a hand crank can be connected to drive the actuator 18 for movement during, for example, maintenance and servicing operations. In normal use, the ring 3 is held against movement and can be viewed as fixed.

The drive ratio between the electric motor and actuator may be configured as required, based on the electric motor and actuator characteristics, the slip speed of the eddy current clutch, and the drive ratio of the first and second epicyclic gearboxes 4a, 4b and the associated output gears 43, 45, 47.

The carrier 5 of the second epicyclic gearbox 4b is further coupled to a stop arrangement 44. The stop arrangement 44 comprises a threaded shaft or tube 48, on which is carried a stop nut 49. The nut 49 is held against rotation, and it will be appreciated that rotation of the tube 48 causes the nut 49 to translate along the length of the tube 48. Limit stops 50 limit the range of movement of the nut 49, and hence limit the number of revolutions that the tube 48 is permitted to make. It will be appreciated that when the stop nut 49 hits a limit stop 50, rotation of the threaded tube 48 is prevented. This, in turn, prevents rotation of the carrier 5 and so prevents further movement of the actuator 18.

The provision of the stop arrangement 44 may thus negate the need to provide separate stops on each actuator 18, or may permit the size of such stops to be reduced.

With the exception of the operation of the stop arrangement 44, the arrangement of FIG. 4 operates in largely the same manner as described hereinbefore and so further description of its operation will not be set out herein.

Whilst described hereinbefore in connection with an arrangement including an eddy current based clutch, it will be appreciated that the stop arrangement may be associated with arrangements having other forms of clutch, or indeed arrangements in which no clutch is provided between the motor and the actuator.

An eddy current clutch has no wearing parts, and can therefore provide highly reliable operation without the need to replace frictional surfaces. The eddy current clutch may be designed to slip under all conditions, providing an apparent speed reduction that enables a smaller, high speed motor to be used. The likely failure mode of the clutch is to reduce the rotational resistance between the fixed and moving elements thereof, which will manifest itself as an increase in the operation time of the actuator, which is a safe failure condition (in contrast with a mechanical friction arrangement, which may jam or fail more suddenly).

An eddy current drive clutch system may be used to enable manual operation, the torque limiting behavior of the eddy current clutch limiting the maximum applied load.

Without the eddy current drive clutch, high loads may be applied during manual operation that can result in damage or failure of elements of the drive system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated While the exemplary embodiment to the disclosure has been described, it will be understood that those skilled in the art, both now and in the future, may make various improvements and enhancements which fall within the scope of the claims which follow. These claims should be construed to maintain the proper protection for the disclosure first described.

What is claimed is:

1. An actuator arrangement comprising:
   an epicyclic gear set including a sun gear;
   at least one planet gear in meshing engagement with the sun gear;
   a ring gear in meshing engagement with the planet gear, the planet gear being carried by a rotatable support, wherein one of the sun gear and the support is arranged to be driven by a motor and the other of the sun gear and the support is arranged to drive an actuator; and
   a clutch arrangement operable to resist rotation of the ring gear;
   wherein the clutch arrangement comprises an eddy current clutch that includes a permanent magnet and a conducting element, one of which is coupled to the ring gear and the other being fixed, with an air gap being provided between the magnet and conducting element, wherein the permanent magnet is coupled to the ring gear of the epicyclic gear set and the conducting element is fixed.

2. The actuator arrangement of claim 1, further comprising an electric motor coupled to the epicyclic gear set.

3. The actuator arrangement of claim 2, wherein the motor is a fixed speed motor.

4. The actuator arrangement of claim 2, further comprising a ball-screw actuator coupled to the epicyclic gear set.

5. The actuator arrangement of claim 1, wherein the clutch arrangement comprises a frictional clutch.

6. The actuator arrangement of claim 1, wherein a plurality of epicyclic gear sets is provided, arranged in series.

7. The actuator arrangement of claim 1, further comprising a stop means that comprises a stop element, a threaded element and limit stops, wherein the threaded element is coupled to an actuator drive shaft, the stop element is engaged with the threaded element so as to move along the threaded element as the threaded element rotates, and the limit stops are arranged to limit the extent of movement of the stop element along the threaded element.

* * * * *